United States Patent
Sakamoto

[11] Patent Number: 5,870,226
[45] Date of Patent: Feb. 9, 1999

[54] MICROSCOPE AND EYEPIECE OF THE SAME

[75] Inventor: Shinobu Sakamoto, Yokosuka, Japan

[73] Assignee: Nikon Corporation, Tokyo, Japan

[21] Appl. No.: 957,584

[22] Filed: Oct. 24, 1997

[30] Foreign Application Priority Data

Oct. 25, 1996 [JP] Japan ................................. 8-300884

[51] Int. Cl.⁶ ........................... G02B 23/16; G02B 21/00
[52] U.S. Cl. ........................ 359/600; 359/368; 359/611
[58] Field of Search ................................. 359/368, 399,
359/402, 405–407, 503, 506–514, 600–601,
611–612, 811–812, 815–819, 827–830,
892, 894

[56] References Cited

U.S. PATENT DOCUMENTS

| | | | |
|---|---|---|---|
| 2,418,298 | 4/1947 | French | 359/513 |
| 4,307,931 | 12/1981 | Blake | 359/600 |
| 4,566,789 | 1/1986 | Weber | 356/241 |
| 5,198,929 | 3/1993 | Clough | 359/513 |
| 5,225,932 | 7/1993 | Wannagot et al. | 359/611 |

*Primary Examiner*—Thong Nguyen
*Attorney, Agent, or Firm*—Foley & Lardner

[57] ABSTRACT

A microscope has an eyepiece detachably/attachably inserted in a tube eyepiece mounting portion. The eyepiece has an elastic cover, whose inside protrusion portion is fitted to a peripheral groove at a position between an eyelet and a joint portion of the eyepiece with the mounting portion. The cover extends from the joint portion and sheathes over the mounting portion. An inner diameter of the elastic cover is smaller than an outer diameter of the mounting portion at the joint portion. Thus the elastic cover can shield the joint portion with reliability and no fine particle can intrude into the microscope.

12 Claims, 4 Drawing Sheets

MICROSCOPE AND EYEPIECE OF THE SAME

BACKGROUND OF THE INVENTION

1. Field of the Invention

The present invention relates to a microscope, more specially relates to a dustproof microscope and an eyepiece of dustproof microscope.

2. Related Background Art

FIG. 5 is a longitudinal, cross-sectional view of a conventional eyepiece portion of microscope. This figure shows the installed state of the eyepiece on the microscope.

The eyepiece of microscope (as will be referred simply as an eyepiece) 100 is provided with two lenses 101, 102, and a holder 110 for holding these lenses 101, 102, the holder 110 being arranged to be detachably coupled with an eyepiece mounting portion 150 of the main body of microscope (not illustrated).

The two lenses 101, 102 are fixed at predetermined positions by stopper ring 121 and separation ring 122, the stopper ring 121 being in mesh with female thread 111 formed in an inside peripheral surface of holder 110. The magnification of eyepiece is determined to be a desired value by combination of these lenses or the number of lenses.

The holder 110 is composed of inserting portion 110a having an outside diameter a little smaller than an inside diameter of the eyepiece mounting portion 150 and arranged to be inserted into the eyepiece mounting portion 150 and body portion 110b having outside diameters greater than that of the eyepiece mounting portion 150 and arranged to be mounted on the top part of the eyepiece mounting portion 150.

According to the configuration as described above, the eyepiece 100 can be mounted on the eyepiece mounting portion 150 on the occasion of observation, by inserting the inserting portion 110a into the eyepiece mounting portion 150 before abutting joint 112 of the lower end face of body portion 110b comes to abut against the top surface of eyepiece mounting portion 150; and the eyepiece can be replaced by another eyepiece 100 of a different magnification.

The eyecup 130 is mounted on the holder 110 for preventing unwanted light from the outside of eyepiece 100 entering the eye during observation. This eyecup 130 is made of an elastic material such as rubber to protect an observer's face or spectacle lens.

Incidentally, the microscopes are not always used in clean environments where the temperature and humidity are maintained moderate and where there are only a very small amount of fine particles such as dust in the air.

For example, in metal part processing factories, the microscopes are used for observing states of processed surface of part. Since a large amount of cutting oil is used in such factories, fine particles of cutting oil are always floating in the air.

The fine particles attach to the surface of microscope and also intrude even into the microscope through the clearance and the coupling parts between the eyepiece mounting portion 150 and the holder 110.

The fine particles will adhere to optical members, such as the lenses inside the microscope, causing troubles, including degradation of optical performance (degraded viewing of image upon observation).

Some treatment for removing the fine particles by overhaul or the like is necessary for recovery of optical performance by overcoming the troubles, which requires costly maintenance to maintain the required optical performance.

SUMMARY OF THE INVENTION

The present invention has been contemplated to overcome these problems. An object thereof is to provide a microscope and an eyepiece of microscope that can be more economically maintained by preventing the fine particles from intruding into the microscope upon mounting of eyepiece, thereby omitting the need for overhaul or the like.

For achieving the above object, a microscope of the present invention has an eyepiece detachably/attachably inserted in a tube eyepiece mounting portion and has an elastic cover. This elastic cover's inside protrusion portion is fitted to a peripheral groove at a position between an eyelet and a joint portion of the eyepiece with the mounting portion, and extends from the joint portion and sheathes over the mounting portion. An inner diameter of the elastic cover is made smaller than an outer diameter of the mounting portion at the joint portion.

As the coupling parts of the eyepiece mounting portion and the eyepiece are sealed by the elastic cover, the fine particles floating in the outside space of microscope cannot intrude through the coupling parts into the inside of microscope. Thus, the optical performance is not degraded since the fine particles cannot adhere to the optical members, such as the lenses inside the microscope. Accordingly, there is no need to overhaul the eyepiece for maintaining the optical performance, and maintenance expenses of microscope can be reduced.

An inner diameter of the elastic cover's front-end on the mounting portion is preferably larger than an outer diameter of the mounting portion.

According to this, the insertion of eyepiece can be readily achieved. This invention permits smooth eyepiece replacement.

More preferably the elastic cover has a cutting thread on inside or outside surface thereof between the protrusion portion and the joint portion.

According to this, the elastic cover can be turned up at a position of the cutting thread to readily insert the eyepiece to the mounting portion. After inserting the eyepiece, the elastic cover back shields the coupling part with reliability.

The eyepiece may be provided with an eyecup and the elastic cover may be formed as integral with the eyecup.

Since the elastic cover, together with the eyecup, can be fabricated by a single mold, the manufacturing cost can be lowered and the eyepiece capable of maintaining the predetermined optical performance can be provided at low cost.

The eyepiece of the present invention has similar characteristics describing above.

BRIEF DESCRIPTION OF THE DRAWINGS

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating pre

DESCRIPTION OF THE PREFERRED EMBODIMENT

In the following, some embodiments in accordance with the present invention will be explained with reference to attached drawings. Here, among the drawings, identical or similar elements will be referred to using the same reference numbers without repeating their description.

First, the general configuration of a stereoscopic microscope will be explained. Such a stereoscopic microscope is described by William E. Weber et al. in the U.S. Pat. No. 4,566,789, which is incorporated herewith by reference.

Figure 1:
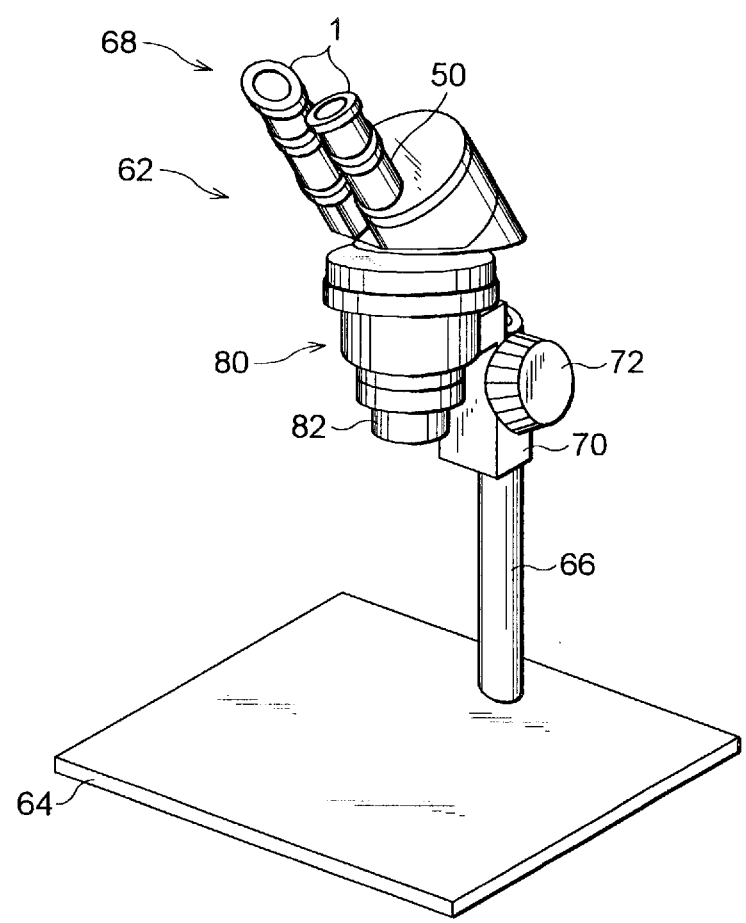
- FIG. 1 is a schematic view showing typical stereoscopic microscope that can use the eyepiece of the present invention.

Referring to FIG. 1, the stereoscopic microscope 62 of the invention has a base 64 having a vertical microscopic mounting post 66 at the rear thereof. The post 66 supports for vertical movement a microscope inspection body 68. The microscope body 68 is shown having a focusing mount 70 including a focusing knob 72 that, when rotated, varies the position of the focusing mount 70 on the vertical post 66 in a conventional way. A pair of eyepieces 1 through which the user views the the specimen being examined are mounted on the eyepiece mounting portion 50 of the microscope body 68. The present invention is related to this aspect. Zoom lens groups and prism members are placed in a lens-barrel 80. The objective lens unit 82 having a large aperture is located facing an object to be examined (not illustrated). The image of the object to be examined is magnified by the objective lens unit 82, the zoom lens groups in the lens-barrel 80 and the eyepieces 1.

Now, the eyepiece 1 part of the present invention will be explained.

Figure 2A:
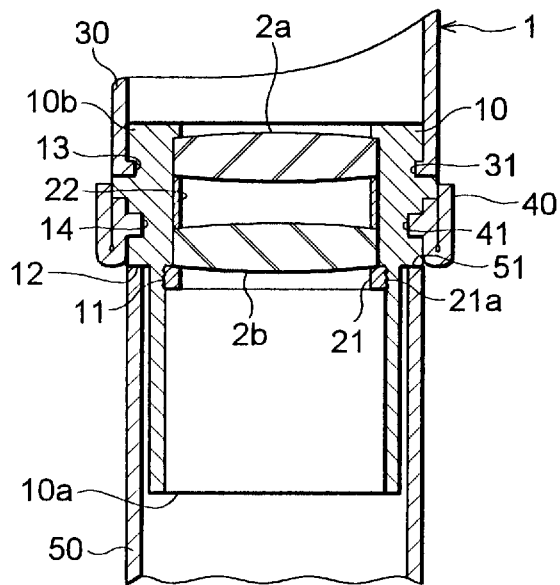
FIGS. 2A and 2B is a longitudinal, cross-sectional view of the eyepiece portion of microscope according to the first embodiment of this invention.
Figure 2B:
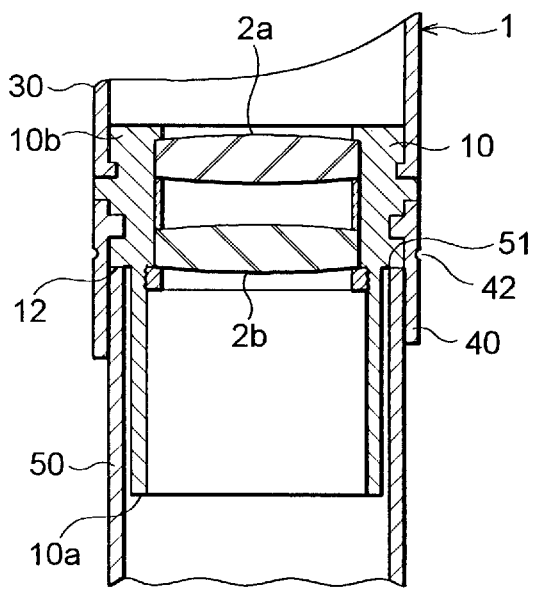

FIGS. 2A and 2B are longitudinal, cross-sectional views of an eyepiece part of microscope associated with another modification of the first embodiment of this invention.

FIG. 2A shows a state during an insertion of the eyepiece to the body of the microscope and FIG. 2B shows a state after the insertion.

The eyepiece 1 is composed of holder 10, elastic cover 40, lenses 2a, 2b, stopper ring 21, separation ring 22, and eyecup 30.

The holder 10 consists of inserting portion 10a and body portion 10b formed integrally with this inserting portion 10a. The inserting portion 10a has a uniform outside diameter that is a little smaller than the inside diameter of the eyepiece mounting portion 50. The outside diameters of the body portion 10b are larger than that of the eyepiece mounting portion 50. Two annular grooves 13, 14 are formed in the outside peripheral surface of the body portion 10b.

An annular protrusion portion 31 at the lower end of eyecup 30 is fitted in the upper annular groove 13, so that the holder 10 securely holds the eyecup 30.

Female thread 11 is formed in an intermediate portion of the inside peripheral surface of holder 10 and external thread 21a in the outside peripheral surface of stopper ring 21 is in mesh with this female thread 11.

The lens 2b is positioned on the stopper ring 21 and the lens 2a is located at a position apart by the axial length of separation ring 22 from this lens 2b.

The elastic cover 40 is made of an elastic member, e.g., urethane rubber, chloroprene rubber, elastomer or the like. And the elastic cover 40 is formed in an almost cylindrical shape having inside diameters slightly smaller than the body portion 10b, and is mounted by elastic force on the outside peripheral surface of body portion 10b.

An annular protrusion portion 41 is formed in the inside peripheral surface of the elastic cover 40. This protrusion portion 41 is fitted in the lower annular groove 14 of holder 10 so that the holder 10 securely holds the elastic cover 40.

A cutting thread 42 is formed throughout the entire circumference of the outside peripheral surface of the elastic cover 40, so that the elastic cover 40 can be turned up at a position of the cutting thread 42.

The cutting thread 42 is formed at the position where, in the turned-up state shown in FIG. 2A, the lower end of the elastic cover 40 is out of contact with the outside peripheral surface of the eyepiece mounting portion 50.

For mounting the eyepiece 1 onto the eyepiece mounting portion 50, the inserting portion 10a is first inserted into the eyepiece mounting portion 50 with the elastic cover 40 turned up as shown in FIG. 2A until the lower end of the body portion (the abutting joint 12) comes to abut against the abutting portion 51 at the upper end of the eyepiece mounting portion 50.

After that, the elastic cover 40, having been turned up, is brought back into the cylindrical state as shown in FIG. 2B.

The inside diameters of the elastic cover 40 decrease toward the bottom, and the inside peripheral surface of the elastic cover 40 thus closely fits the outside peripheral surface of eyepiece mounting portion 50.

As a result, the joint portion of the holder 10 and eyepiece mounting portion 50 (which are the abutting joint 12 and the abutting portion 51 at the upper end of the eyepiece mounting portion 50) are sealed by the elastic cover 40.

When the eyepiece 1 is detached from the eyepiece mounting portion 50, the elastic cover 40 is first turned up and thereafter the eyepiece 1 is pulled away from the eyepiece mounting portion 50.

According to this first embodiment, even if the microscope is used in such places that the fine particles of cutting oil or the like are floating in the air as in the metal part processing factories, the fine particles can be prevented from intruding into the inside of microscope.

Figure 3:
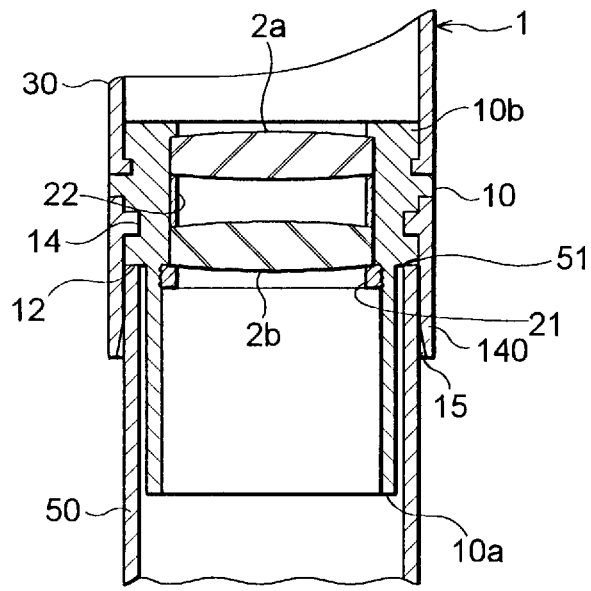
FIG. 3 is a longitudinal, cross-sectional view of the eyepiece portion of microscope according to the second embodiment of this invention.

FIG. 3 is a longitudinal, cross-sectional view of an eyepiece of microscope according to the second embodiment of this invention, wherein the same portions as in the first embodiment are denoted by the same reference numerals, and the redundant description thereof has be omitted.

This embodiment is different from the first embodiment described above in that a cutting thread is not formed and a taper portion 15 is formed in the lower, inside peripheral surface of the elastic cover 140, for facilitating mounting of the elastic cover 140 onto the outside peripheral surface of the eyepiece mounting portion 50.

For mounting the eyepiece 1 onto the eyepiece mounting portion 50, the inserting portion 10a of holder 10 is first inserted into the eyepiece mounting portion 50. During the insertion of the inserting portion 10a, the lower end of the elastic cover 140 first reaches the upper end of eyepiece mounting portion 50.

After that, the abutting joint 12 of the body portion 10b comes to abut against an abutting portion 51 at the upper end of the eyepiece mounting portion 50.

Since the taper portion 15 is formed in the inside peripheral surface at the lower end of the elastic cover 140, the elastic cover 140 can be inserted into the eyepiece mounting portion 50 on a smooth basis.

Since the inside diameters of the elastic cover 140 decrease toward the bottom, the lower, inside peripheral surface of the elastic cover 140 is closely fitted with the outside peripheral surface of the eyepiece mounting portion 50.

As a result, the joint portion of the holder 10 and the eyepiece mounting portion 50 are sealed by the sealing member 50.

When the eyepiece 1 is detached from the eyepiece mounting portion 50, the eyepiece 1 is pulled in the opposite direction to the above.

This modification can demonstrate the same effect as the first embodiment.

Figure 4:
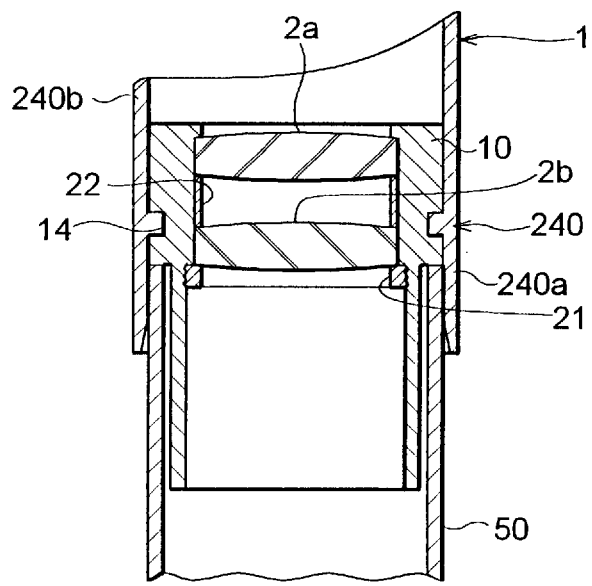
FIG. 4 is longitudinal, cross-sectional views of the eyepiece portion of microscope according to the third embodiment of this invention.
Figure 5:
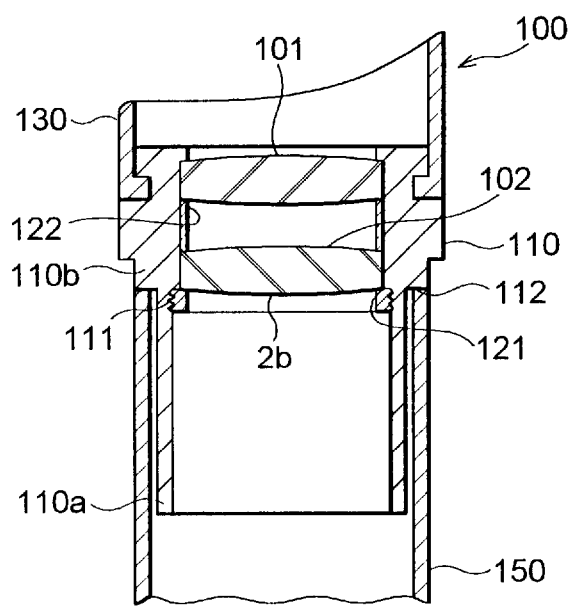
FIG. 5 is a longitudinal, cross-sectional view of the conventional eyepiece portion of microscope.

FIG. 4 is a longitudinal, cross-sectional view of an eyepiece of microscope according to the third embodiment of the present invention, wherein the same portions as in the second embodiment are denoted by the same reference numerals, and redundant description thereof has been omitted.

The elastic cover 40, or 140 and eyecup 30 are separated from each other in the first and second embodiments described above, but in the third embodiment the eyecup and elastic cover are formed integrally as shown in FIG. 4.

In this embodiment the elastic cover 240 is comprised of sealing portion 240a and eyecup portion 240b. The upper annular groove 13 of the second embodiment is excluded in conjunction with the integration.

This modification can demonstrate the same effect as the second embodiment and permits the elastic cover to be fabricated together with the eyecup portion by a single mold, thus decreasing the manufacturing cost.

The present invention involves not only the microscope with the eyepiece as described above, but also the eyepiece alone. The eyepiece of the present invention can be used for the conventional microscope as replacing the conventional eyepiece.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A microscope comprising:
   a tube eyepiece mounting portion; and
   an eyepiece detachably connectable to said tube eyepiece mounting portion, said eyepiece having:
   a holder having an insertion portion insertable into said tube eyepiece mounting portion and a body portion extending from the insertion portion;
   a peripheral groove formed on said body portion; and
   an elastic cover having an inside protrusion portion received in said peripheral groove, said elastic cover extending from said peripheral groove toward and beyond said tube eyepiece mounting portion,
   wherein an inner diameter of said elastic cover is smaller than an outer diameter of an end portion of said tube eyepiece mounting portion.

2. A microscope according to claim 1, wherein an inner diameter of a front-end of said elastic cover, which covers over said mounting portion, is larger than an outer diameter of said mounting portion.

3. A microscope according to claim 1, wherein said elastic cover has a cutting thread on an outside surface thereof between said protrusion portion and said end portion of said tube eyepiece mounting portion.

4. A microscope according to claim 1, wherein said eyepiece includes an eyecup and said elastic cover is formed integrally with said eyecup.

5. An eyepiece for a microscope comprising:
   an inserting portion adapted to be inserted into a tube eyepiece mounting portion of said microscope;
   a body portion extending from said inserting portion having a diameter larger than said inserting portion, said body portion having a peripheral groove; and
   an elastic cover having an inside protrusion portion received in said peripheral groove, said elastic cover extending to said inserting portion,
   wherein an inner diameter of said elastic cover is adapted to be smaller than an outer diameter of said body portion at a boundary of said body portion and said inserting portion.

6. An eyepiece according to claim 5, wherein an inner diameter of a front-end of said elastic cover is larger than said outer diameter of said body portion.

7. An eyepiece according to claim 5, wherein said elastic cover has a cutting thread on an outside surface thereof between said protrusion portion and a boundary of said body portion and said inserting portion.

8. An eyepiece according to claim 5, wherein said eyepiece includes an eyecup and said elastic cover is formed integrally with said eyecup.

9. A microscope comprising:
   a tube eyepiece mounting portion; and
   an eyepiece detachably connectable to the tube eyepiece mounting portion, the eyepiece having:
   a joint portion, which abuts a top end of the tube eyepiece mounting portion when the eyepiece is inserted in the tube eyepiece mounting portion; and
   an elastic cover, which is sheathed over between the tube eyepiece mounting portion and the joint portion, and wherein an inner diameter of the elastic cover is smaller than an outer diameter of the tube eyepiece mounting portion abutting the joint portion.

10. A microscope according to claim 9, wherein an inner diameter of a front-end of the elastic cover, which covers over the tube eyepiece mounting portion, is larger than an outer diameter of the tube eyepiece mounting portion.

11. A microscope according to claim 9, wherein the elastic cover has a cutting thread on an outside surface thereof adjacent the end portion of the tube eyepiece mounting portion.

12. A microscope according to claim 9, wherein the eyepiece includes an eyecup and the elastic cover is formed integrally with the eyecup.

* * * * *